United States Patent
Schaeffer et al.

[11] Patent Number: 5,783,315
[45] Date of Patent: Jul. 21, 1998

[54] TI-CR-AL PROTECTIVE COATINGS FOR ALLOYS

[75] Inventors: Jon C. Schaeffer, Milford; Russell L. McCarron, Cincinnati, both of Ohio; Gerald H. Meier, Pittsburgh, Pa.; Roger A. Perkins, Weed; Joseph F. Cullinan, San Francisco, both of Calif.

[73] Assignee: General Electric Company, Cincinnati, Ohio

[21] Appl. No.: 814,128

[22] Filed: Mar. 10, 1997

[51] Int. Cl.⁶ .................... B32B 15/00; B32B 15/20
[52] U.S. Cl. .................... 428/633; 428/651; 428/660; 427/405; 427/419.1; 416/241 R
[58] Field of Search ............... 428/660, 632, 428/633, 651; 427/405, 419.1; 416/241 R, 241 B

[56] References Cited

U.S. PATENT DOCUMENTS

| | | | |
|---|---|---|---|
| 3,268,306 | 8/1966 | Jefferys | 29/194 |
| 4,214,042 | 7/1980 | Wilson | 428/678 |
| 4,305,998 | 12/1981 | Manty et al. | 428/661 |
| 4,615,868 | 10/1986 | Dardi et al. | 420/437 |
| 4,891,184 | 1/1990 | Mikkola | 420/553 |
| 4,946,749 | 8/1990 | Restall et al. | 428/660 |
| 4,980,244 | 12/1990 | Jackson | 428/660 |
| 5,006,054 | 4/1991 | Nikkola | 420/552 |
| 5,077,140 | 12/1991 | Luthra et al. | 428/660 |
| 5,080,981 | 1/1992 | Fritscher | 428/633 |
| 5,116,690 | 5/1992 | Brindley et al. | 428/614 |
| 5,415,831 | 5/1995 | Baumann et al. | 419/38 |
| 5,601,933 | 2/1997 | Hajmrle et al. | 428/660 |

*Primary Examiner*—John J. Zimmerman
*Attorney, Agent, or Firm*—Andrew C. Hess; David L. Narciso

[57] ABSTRACT

An article having a protective coating thereon includes a substrate having a substrate composition and a substrate surface, and a protective coating contacting and overlying at least a portion of the substrate surface. The substrate is preferably a Ti—Nb aluminide, an α2-titanium aluiminide, or a γ-titanium aluminide. The protective coating includes a metallic layer contacting the substrate surface and having a composition, in atomic percent, of from about 5 to about 40 percent chromium, from about 44 to about 59 percent aluminum, balance titanium plus incidental impurities. The protective coating may further include a ceramic layer contacting and overlying the metallic layer, with the metallic layer lying between the ceramic layer and the substrate.

12 Claims, 4 Drawing Sheets

TI-CR-AL PROTECTIVE COATINGS FOR ALLOYS

The invention herein described was made in the course of or under a contract or subcontract thereunder (or grant) with the Department of the Navy.

BACKGROUND OF THE INVENTION

This invention relates to coatings for the protection of substrates operating at moderately elevated temperatures, and, more particularly, for the protection of titanium-alloy aircraft gas turbine components.

In an aircraft gas turbine (jet) engine, air is drawn into the front of the engine, compressed by a shaft-mounted compressor, and mixed with fuel. The mixture is combusted, and the resulting hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the vanes and blades of the turbine. In current engines, the high-pressure turbine vanes and blades are made of nickel-based superalloys and can operate at temperatures of up to 1900°–2100° F.

As the operating temperatures of the high-pressure turbine vanes and blades are increased using a variety of techniques, the other components of the gas turbine engine must operate at higher temperatures as well. These components include, for example, exhaust ducts, high pressure compressor blades and vanes, low pressure turbine blades and vanes, and combustors. To meet the requirements of increased operating temperatures while maintaining the low weight required in an aircraft gas turbine engine, new alloys such as the titanium aluminides have been developed and introduced into such components.

As is the case for the nickel-base superalloys used in the higher-temperature elements of the engine, the alloys selected for medium-temperature components are exposed to severe environmental attack during service. These modes of attack include oxidation, hot corrosion, and hot salt stress corrosion. The alloys selected for good mechanical properties and low weight are often highly susceptible to damage by such environmental factors. Additionally, in some instances it is desirable that the coating provide a degree of thermal insulation for the component, allowing it to be used at higher temperatures than would otherwise be possible.

It is therefore necessary to protect the components from environmental and thermal exposure. One approach is to use protective surface coatings which resist damage, but which do not themselves have the necessary mechanical properties for use as the entire component. Existing protective coating systems developed for nickel-base superalloys can be used in these applications but do not permit attainment of the maximum performance of the component for a variety of reasons. There is thus a need for an improved environmental coating system for use on alloys used in intermediate-temperature applications. The present invention fulfills this need, and further provides related advantages.

SUMMARY OF THE INVENTION

The present invention provides a protective coating on a titanium-alloy article suitable for medium-temperature service in hostile environments, and a method for preparing such a coating and article. The coating provides an effective barrier against oxidation and corrosion of the underlying substrate. The coating has a coefficient of thermal expansion that is closely matched to that of its substrate, minimizing stresses and strains resulting from thermal expansion mismatches as the temperature of the coated component changes during service. The composition of the coating is also selected to minimize the diffusional formation of phases or compositions which, if present, would degrade the coating and/or the underlying substrate during extended exposure at elevated temperatures.

In accordance with the invention, an article having a protective coating thereon comprises a titanium-alloy substrate having a substrate composition and a substrate surface, and a protective coating contacting and overlying at least a portion of the substrate surface. The protective coating comprises a metallic layer contacting the substrate surface and having a composition, in atomic percent, of from about 5 to about 40 percent chromium, from about 44 to about 59 percent aluminum, balance titanium plus incidental impurities.

In one application, the metallic layer serves as a bond coat in a thermal barrier coating system. In that case, the protective coating further comprises a ceramic layer such as yttria-stabilized zirconia contacting and overlying the metallic layer, such that the metallic layer lies between the ceramic layer and the substrate. The chromium content of the metallic layer is preferably from about 5 to about 20 atomic percent in the bond coat application, more preferably from about 10 to about 20 atomic percent chromium, and most preferably about 20 atomic percent chromium. The aluminum content is preferably from about 51 to about 46 atomic percent aluminum.

In another application, it has been observed that the mechanical hardness of the metallic layer increases substantially with increasing chromium content. A high-chromium metallic layer, with a chromium content extending as high as about 40 atomic percent, functions as a wear-resistant, environmentally resistant coating on surfaces that are subjected to mechanical wear during service. In this case, no ceramic layer overlies the metallic layer.

The substrate for the protective coating is a titanium-containing alloy, such as an α2-titanium aluminide or a γ-titanium aluminide. Such titanium alloys have good mechanical properties with low weight for intermediate-temperature applications, but they are not resistant to certain types of environmental damage experienced in aircraft gas turbine applications. The present protective coating protects such titanium substrates against environmental damage. The thermal expansion coefficients of the substrate and the coating are reasonably well matched, avoiding large thermal expansion stresses and strains and the rumpling or spalling of the coating that would otherwise be present if the thermal expansion coefficients were widely different. When a ceramic thermal barrier coating is applied over the metallic layer bond coat, the coating also provides a degree of thermal insulation for the component. The present invention thus provides a protectively coated component of particular value in intermediate-temperature aircraft turbine applications.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
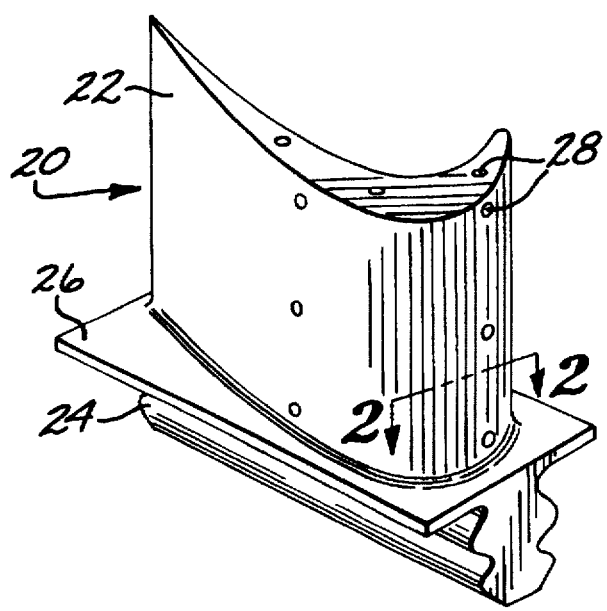
FIG. 1 is a perspective view of a gas turbine component.

FIG. 1 depicts a component of a gas turbine engine such as a turbine blade or turbine vane, in this case depicted as a low-pressure turbine blade 20. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. Optionally, a number of cooling channels extend through the interior of the airfoil 22, ending in openings 28 in the surface of the airfoil 22. A flow of cooling air is directed through the cooling channels, to reduce the temperature of the airfoil 22. Although the invention is illustrated in relation to this preferred embodiment of a titanium-alloy turbine blade, the coating approach is equally applicable to other titanium-alloy components such as, for example, exhaust structures, high-pressure compressor vanes and disks, inlet guide vanes, combustor cases, and the like.

Figure 2A:
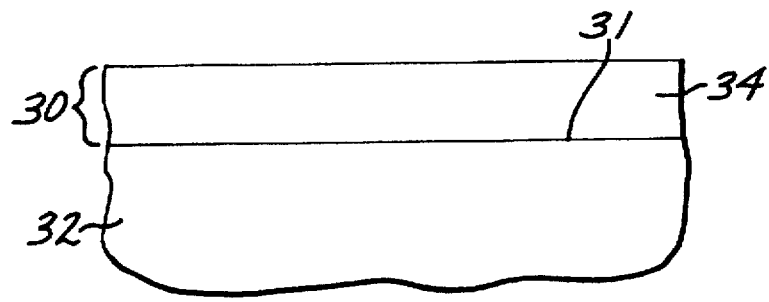
FIG. 2A is a schematic sectional view through the component of FIG. 1 along line 2—2, showing one embodiment of the invention.
Figure 2B:
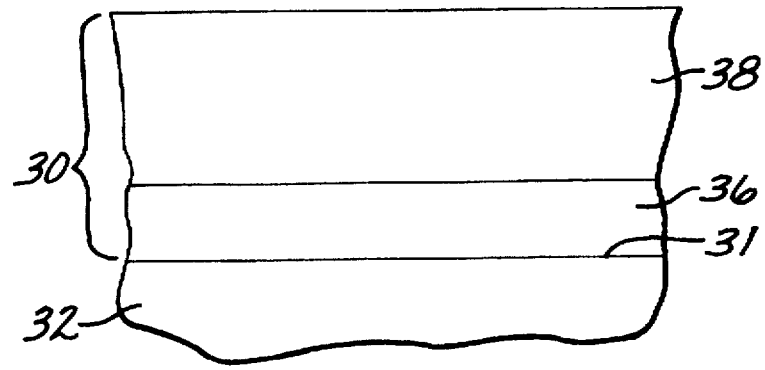
FIG. 2B is a schematic sectional view through the component of FIG. 1 along line 2—2, showing a second embodiment of the invention.

The airfoil 22 of the turbine blade 20 is protected by a protective coating 30, two embodiments of which are illustrated in FIG. 2A and FIG. 2B. In each case, the protective coating 30 is present at a surface 31 of the turbine blade 20, which serves as a substrate 32 for the protective coating 30.

In the embodiment of FIG. 2A, the protective coating 30 comprises a metallic layer 34 located at the surface 31 of the substrate 32. In the embodiment of FIG. 2B, the protective coating 30 comprises a metallic layer 36 at the surface 31 of the substrate 32 and a ceramic thermal barrier layer 38 overlying the metallic layer 36. The protective coating 30 shown in FIG. 2B, including the metallic region 36 (in this context termed a bond coat) and the ceramic layer 38, is sometimes termed a thermal barrier coating system. The two metallic layers 34 and 36 may be of the same or different structures and compositions, within the scope of the invention. The metallic layers 34 and 36 may be any operable thickness, but are typically on the order of a few thousandths of an inch thick.

Figure 3:
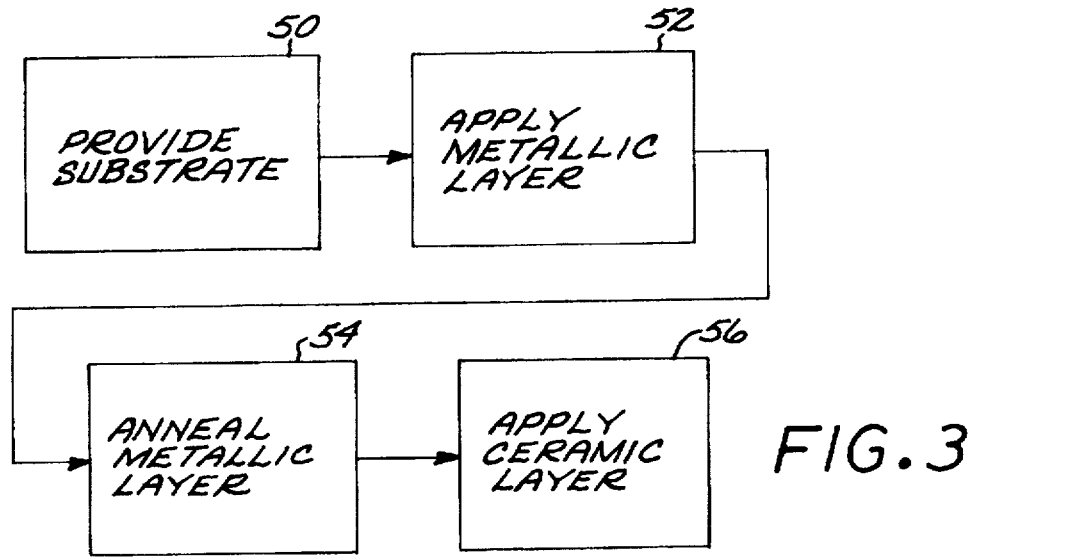
FIG. 3 is a block flow diagram for a method for applying a protective coating to a substrate.

FIG. 3 depicts a preferred method for practicing the invention. The substrate 32 is provided, numeral 50. The substrate is formed to the required shape by an appropriate technique such as casting in the case of the turbine blade 20. The preparation of the basic substrate form is known in the art for each specific type of substrate.

The substrate is made of a titanium-containing alloy, more preferably an alloy based upon the titanium-aluminum system. The preferred titanium-aluminum alloys are, or are based upon, Ti—Nb aluminide (orthorhombic $Ti_2NbAl$), $\alpha$2-titanium aluminide ($Ti_3Al$), and -titanium aluminide (TiAl). (All compositions and percentages expressed herein are in atomic percent, unless otherwise indicated.) It is known in the art to use these titanium aluminides without or with further alloying additions such as niobium, chromium, and tantalum, tungsten, manganese, silicon, and boron. Such titanium-aluminum alloys are used in intermediate-temperature gas-turbine applications due to their mechanical properties at ambient and intermediate temperatures and their relatively low densities. The coating system of the invention is also operable with other titanium alloys such as, for example, Ti-6Al-4V (expressed in weight percent), Ti-1100, and Ti-6242.

The surface of the substrate is prepared for application of the metallic layer. For the preferred plasma spraying approach, the surface of the substrate is roughened slightly by grit blasting or vapor honing. It is thereafter cleaned of residue with a solvent and/or an alkaline cleaning solution used in an ultrasonic bath.

The metallic layer is applied, numeral 52. The metallic layer has a composition comprising from about 5 to about 40 atomic percent chromium, from about 44 to about 59 atomic percent aluminum, balance titanium plus incidental impurities. Optionally, minor amounts of alloying elements such as niobium, tungsten, tantalum, molybdenum, silicon, and boron may be present, as long as they do not interfere with the operability of the invention.

The composition of the metallic coating is selected with regard to protection of the substrate by formation of an adherent aluminum oxide scale in the temperature ranges of interest, to minimization of thermal expansion mismatches between the substrate and the metallic coating, and to avoidance of diffusional degradation of the substrate. If the metallic layer contains below about 5 atomic percent chromium or about 44 atomic percent aluminum, the metallic layer does not form a protective aluminum oxide scale when exposed statically and cyclically in the intermediate temperature range of interest of about 1400°–1850° F. More preferably, the chromium content is more than about 10 atomic percent, because metallic layers with from about 5 to about 10 atomic percent chromium are partially effective but tend to exhibit some $TiO_2$ nodules on their surfaces rather than a continuous aluminum oxide coating.

With increasing chromium content, the mechanical hardness of the metallic layer increases and the tendency for interdiffusion of chromium into the substrate also increases. Increased mechanical hardness of the metallic layer is desirable if the metallic layer is to be used as a wear-resistant coating without any overlying ceramic layer, but excessive hardness inhibits the compliance desirable when the metallic layer is used as a bond coat under a ceramic overlayer. A metallic layer with a chromium content of about 20 atomic percent or less has a hardness suitable for use as a bond coat. If the metallic layer is to be used as a wear-resistant layer, the chromium content is desirably higher, on the order of from about 20 to about 40 atomic percent.

Interdiffusion studies demonstrate that increasing chromium contents of the metallic layer lead to increasing amounts of diffusional degradation of typical substrates by interdiffusion of chromium therein from the metallic layer, during elevated temperature exposure. Above about 40 atomic percent of chromium in the metallic layer, the fraction of chromium-rich precipitates and undesirable phases such as Laves phases in the substrate, resulting from interdiffusion of chromium from the metallic layer, becomes unacceptably high. That is, the metallic layer may still provide a protective function against environmental damage, but the underlying metallurgical structure of the substrate is degraded during long-term exposure. Increasing amounts of chromium also increase the density of the coating.

The amount of chromium present in the metallic layer also affects its coefficient of thermal expansion. The optimum chromium content in respect to thermal expansion mismatch of the metallic layer and the substrate is determined by calculating the magnitude of the stress in the metallic layer at the metallic layer/substrate interface resulting from changes in temperature during service. This stress is determined approximately by the relation $\sigma = E \Delta T \Delta \alpha$, where $\sigma$ is stress, E is the elastic modulus of the metallic layer, $\Delta T$ is the temperature range during service below the temperature at which the metallic layer becomes fully ductile, and '$\alpha$ is the difference in thermal expansion coefficients of the substrate and the metallic layer. This stress resulting from thermal expansion mismatch is compared with the failure stress of the metallic layer. Using realistic values, it is determined that, for typical titanium-aluminide substrates, the chromium content for acceptable thermal stresses in the metallic layer should be from about 15 to about 20 atomic percent.

As indicated, if the aluminum content is below about 44 atomic percent, an acceptable aluminum oxide cannot be formed on the surface of the metallic layer. If the aluminum content is above about 59 atomic percent, the brittle phase $TiAl_3$ is formed, leading to cracking of the metallic layer and initiation of faults at the surface of the substrate. Additionally, when the aluminum content is within the range of from about 44 to about 59 atomic percent, the aluminum content limits interdiffusion between the metallic layer and the substrate.

Thus, if the metallic layer is to be used as a bond coat under a ceramic layer (the FIG. 2B embodiment), the chromium content is preferably from about 10 to about 20 atomic percent, more preferably from about 15 to about 20 atomic percent, and the aluminum content is preferably from about 51 to about 46 atomic percent. If the metallic layer is to be used as a wear-resistant layer or otherwise as an environmentally resistant layer without the presence of a ceramic layer (the FIG. 2A embodiment), the chromium content may be increased to as much as about 40 atomic percent, depending upon the desired hardness of the metallic layer and the willingness to accept some degree of microstructural degradation of the underlying substrate due to interdiffusion of chromium. These limits have been discussed in terms of the γ-titanium aluminide, but are equally applicable for the case of other types of titanium substrates such as α2 titanium aluminides.

The metallic layer is applied to the substrate by any operable technique. The preferred approach is air, inert-gas, or vacuum plasma spray, but other techniques such as sputtering and slurry fusion may be used as well. The metallic layer is typically from about 0.001 to about 0.005 inches thick, most preferably about 0.0025 inches thick.

The metallic layer and substrate may optionally be annealed, numeral 54. The preferred annealing conditions are a temperature of 700° C. and a time of 2 hours, in air or vacuum.

The ceramic layer 38 is applied if the final article is to have the structure of the FIG. 2B embodiment, numeral 56. Any operable ceramic layer may be applied by any operable technique. In the preferred approach, the ceramic layer is yttria-stabilized zirconia (YSZ) having a composition of zirconia stabilized by about 6–8 weight percent yttria. The preferred YSZ is preferably applied by electron beam physical deposition or by air plasma spray. The thickness of the ceramic layer is preferably from about 0.003 to about 0.010 inches, most preferably about 0.005 inches.

A series of studies was performed to support the selection of the metallic layer compositions and to verify the operability of the invention. These studies and results should be taken as exemplary of the invention, and should not be interpreted as limiting of the scope of the invention.

A series of alloys for use in metallic coatings was prepared. The following table presents their compositions:

TABLE I

| Alloy No. | At. % Ti | At % Al | At % Cr |
|---|---|---|---|
| 1 | 36.9 | 54.6 | 8.5 |
| 2 | 34.2 | 49.6 | 16.2 |
| 3 | 37.6 | 49.5 | 12.9 |
| 4 | 28.7 | 44.5 | 26.8 |
| 5 | 20.9 | 44.5 | 34.6 |
| 6 | 35.0 | 47.0 | 18.0 |
| 7 | 41.0 | 50.0 | 9.0 |
| 8 | 39.0 | 55.0 | 6.0 |

Figure 4:
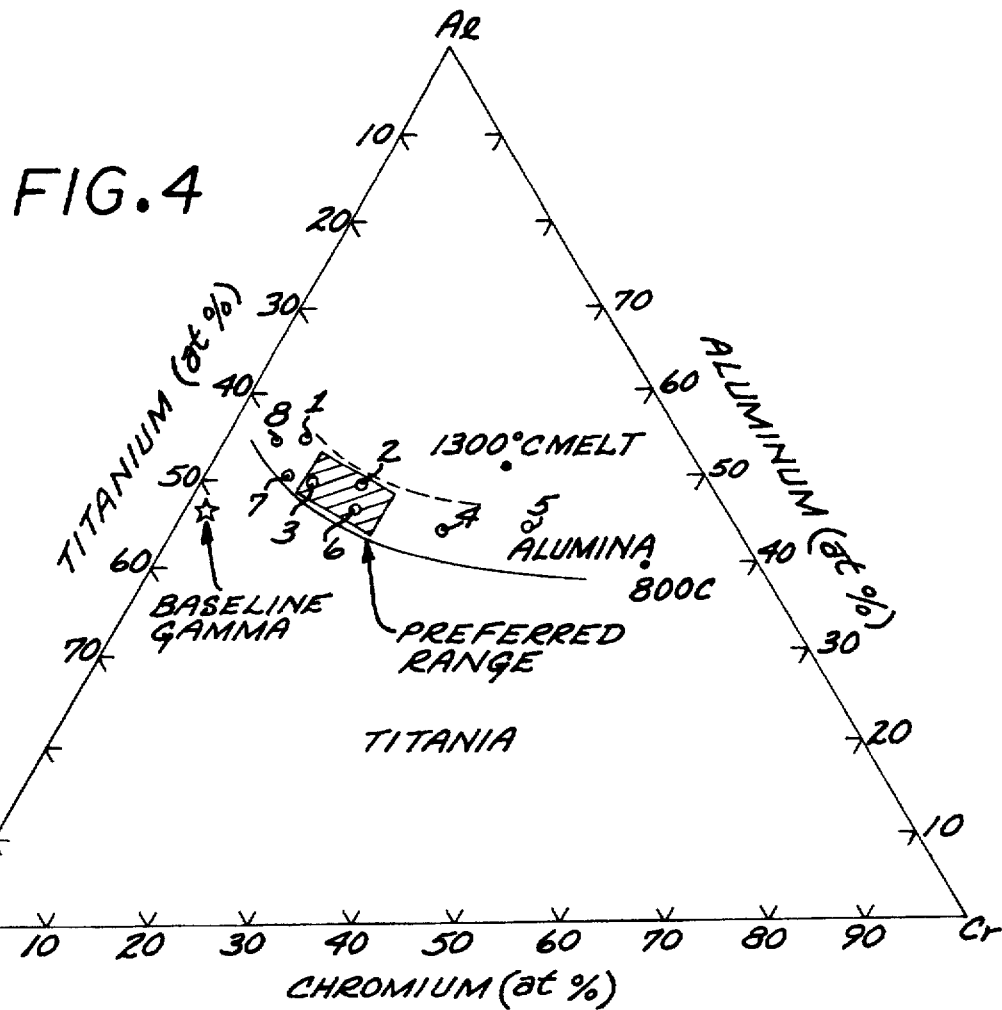
FIG. 4 is a ternary Ti—Cr—Al phase diagram showing the compositions of test specimens.

These compositions are plotted on the ternary Ti—Cr—Al phase diagram of FIG. 4, along with the composition of a substrate alloy used in subsequent testing, Ti-47Al-2Cr-4Ta ("baseline gamma"). The preferred metallic layer compositional range for use on -titanium aluminides is also indicated.

Coating alloys 1, 4, and 6 of Table I were applied as metallic layers in a thickness of about 0.002–0.003 inches to the baseline gamma substrate by thermal spray and sputtering, demonstrating that the coatings can be successfully applied to the substrates of interest.

Figure 5:
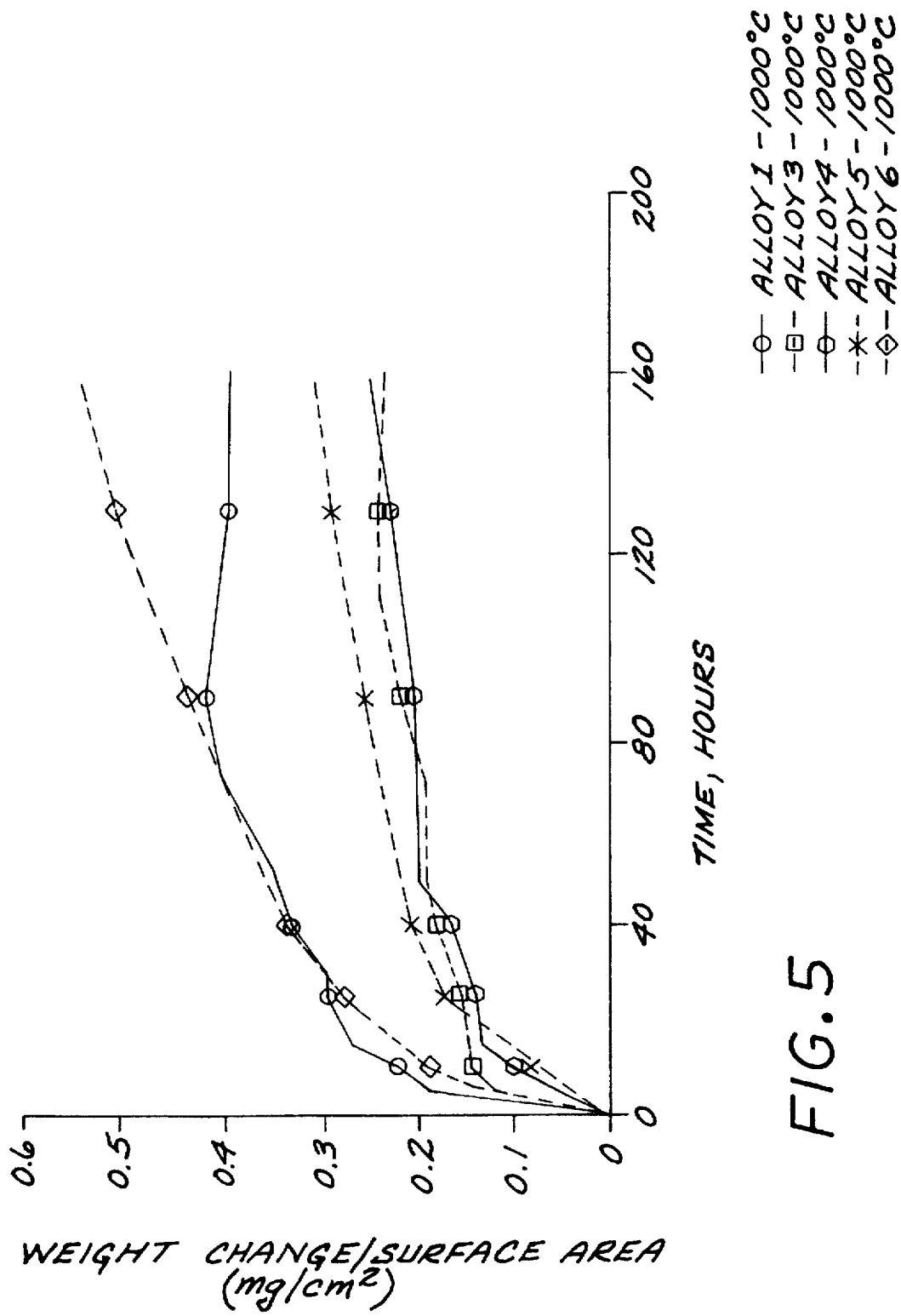
FIG. 5 is a graph of weight change during oxidation as a function of time for some of the test specimens.

FIG. 5 illustrates the oxidation behavior at 1832° F. for a group of the alloys of Table I prepared as bulk specimens, with weight gain plotted as a function of time at temperature. The weight gain for the alloys with 13–35 atomic percent chromium was less than that for alloys with lesser chromium contents. The alloy with the lowest-chromium and highest aluminum contents, alloy 8, exhibits a continuously increasing weight change with time, indicating the absence of a protective $Al_2O_3$ scale. Metallographic studies of the tested specimens showed that alloys having less than 10 atomic percent chromium tended to exhibit $TiO_2$ nodules on the surfaces intermixed with a non-continuous $Al_2O_3$ phase.

Figure 6:
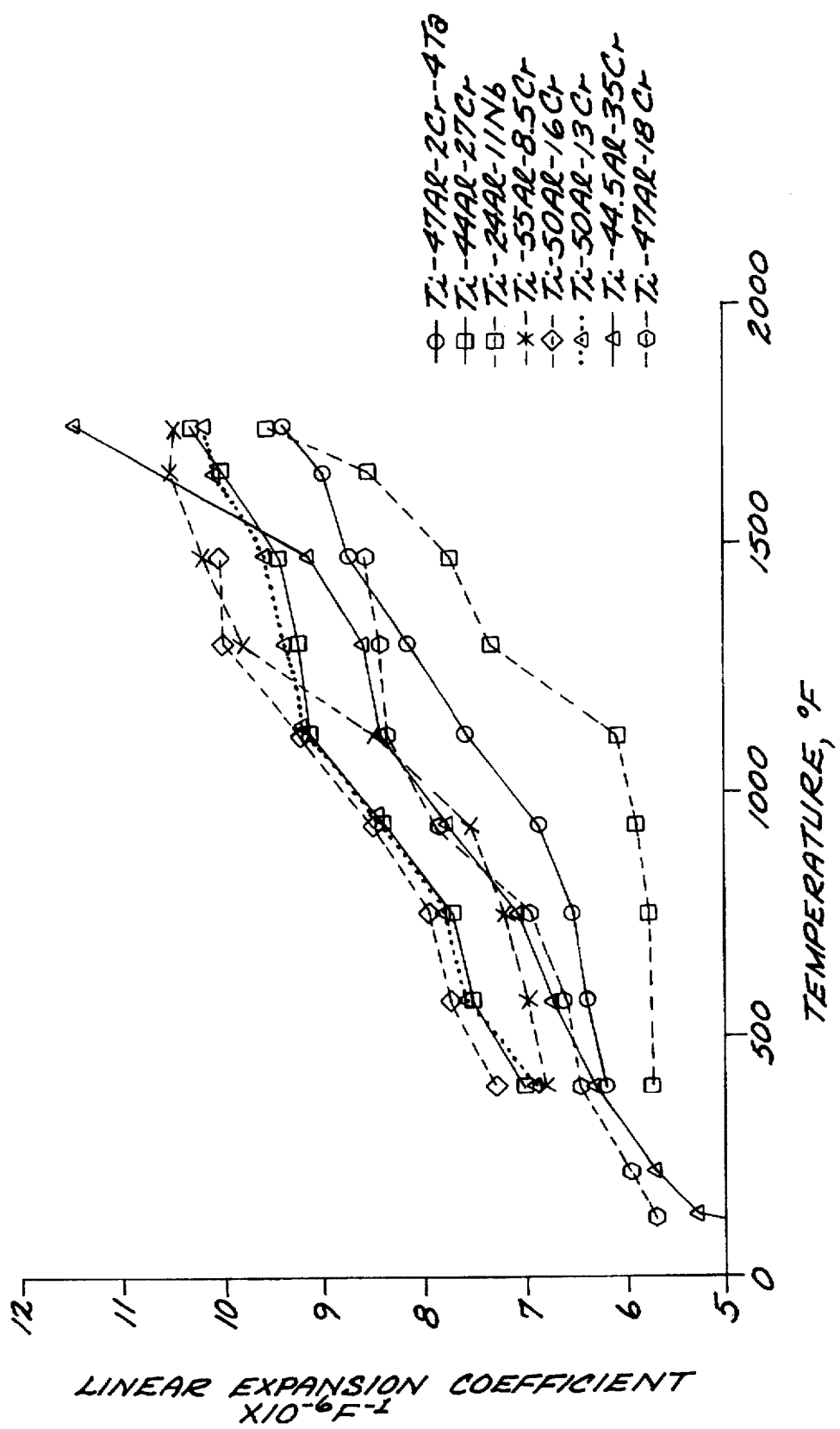
FIG. 6 is a graph showing the coefficient of expansion as a function of temperature for some of the test specimens.

The thermal expansion coefficients of a group of the alloys of Table I, as well as the baseline gamma alloy and a typical α2 alloy (Ti-24Al-11Nb), were measured and are shown in FIG. 6. From this data and the analysis discussed previously, it was concluded that the preferred chromium content is in the range of from about 15 to about 20 atomic percent.

Interdiffusion studies were undertaken using diffusion couples made, in each, case of one of the alloys in Table I and the baseline gamma material. The diffusion couples were annealed in an inert atmosphere at 1832° F. for times up to 256 hours. The couples were thereafter sectioned for microstructural evaluation. The alloys having higher chromium contents in the metallic layers exhibited higher levels of chromium-rich precipitate formation in the substrate and the formation of a Laves phase of approximate composition Ti-33Cr-33Al. The presence of such Laves phases may in some situations cause poor elevated properties, particularly fatigue resistance. Minimization of the incidence of such chromium-rich phases requires less than about 20 atomic percent of chromium in the metallic layer.

In a separate study, a metallic coating layer was prepared with a composition of about 44 atomic percent aluminum, 28 atomic percent chromium, balance titanium. The Rockwell C hardness was measured as $R_C$ 60. It is observed that the metallic layer alloys within the range of the invention have melting points on the order of about 2375° F. When used as wear-resistant coatings, the Ti-Cr-Al alloys of the invention will absorb heat by incipient melting if such high surface temperatures are reached as a result of friction during rubbing.

This invention has been described in connection with specific embodiments and examples. However, those skilled in the art will recognize various modifications and variations of which the present invention is capable without departing from its scope as represented by the appended claims.

What is claimed is:

1. An article having a protective coating thereon, comprising
    a titanium-containing substrate having a substrate composition and a substrate surface; and
    a protective coating contacting and overlying at least a portion of the substrate surface, the protective coating comprising
        a metallic layer contacting the substrate surface and having a composition, in atomic percent, of from about 5 to about 40 percent chromium, from about 44 to about 59 percent aluminum, balance titanium plus incidental impurities.

2. The article of claim 1, wherein the substrate composition is an alloy comprising titanium and aluminum.

3. The article of claim 1, wherein the substrate composition is selected from the group consisting of a Ti-Nb aluminide, an α2-titanium aluminide, and a γ-titanium aluminide.

4. The article of claim 1, wherein the substrate is a component of an aircraft gas turbine.

5. The article of claim 1, wherein the protective coating further comprises
    a ceramic layer contacting and overlying the metallic layer, such that the metallic layer lies between the ceramic layer and the substrate.

6. The article of claim 5, wherein the ceramic layer is yttria-stabilized zirconia.

7. The article of claim 1, wherein the metallic layer has a composition of from about 10 to about 20 percent chromium and from about 51 to about 46 percent aluminum.

8. The article of claim 7, wherein the protective coating further comprises
    a ceramic layer contacting and overlying the metallic layer, such that the metallic layer lies between the ceramic layer and the substrate.

9. The article of claim 8, wherein the ceramic layer is yttria-stabilized zirconia.

10. The article of claim 1, wherein the chromium content of the metallic layer is from about 20 to about 40 percent, and there is no ceramic layer contacting and overlying the metallic layer.

11. A method for preparing an article having a protective coating thereon, comprising
    providing a substrate having a substrate composition and a substrate surface; and
    applying a protective coating to contact and overlie at least a portion of the substrate surface, the protective coating comprising
        a metallic layer contacting the substrate surface and having a composition, in atomic percent, of from about 5 to about 40 percent chromium, from about 44 to about 59 percent aluminum, balance titanium plus incidental impurities.

12. The method of claim 11, wherein the protective coating further comprises
    a ceramic layer contacting and overlying the metallic layer, such that the metallic layer lies between the ceramic layer and the substrate.

* * * * *